(12) United States Patent
Ehlers et al.

(10) Patent No.: US 11,581,777 B2
(45) Date of Patent: Feb. 14, 2023

(54) MOTOR ASSEMBLY WITH A SEPARATING CAN

(71) Applicant: ebm-papst St. Georgen GmbH & Co. KG, St. Georgen (DE)

(72) Inventors: Volker Ehlers, St. Georgen (DE); Martin König, Herrenberg (DE)

(73) Assignee: ebm-papst St. Georgen GmbH & Co. KG, St. Georgen (DE)

(*) Notice: Subject to any disclaimer, the term of this patent is extended or adjusted under 35 U.S.C. 154(b) by 55 days.

(21) Appl. No.: 17/056,601

(22) PCT Filed: Jun. 27, 2019

(86) PCT No.: PCT/EP2019/067178
§ 371 (c)(1),
(2) Date: Nov. 18, 2020

(87) PCT Pub. No.: WO2020/007707
PCT Pub. Date: Jan. 9, 2020

(65) Prior Publication Data
US 2021/0226505 A1    Jul. 22, 2021

(30) Foreign Application Priority Data

Jul. 2, 2018 (DE) ..................... 10 2018 115 952.8

(51) Int. Cl.
*H02K 5/12* (2006.01)
*H02K 5/124* (2006.01)
(Continued)

(52) U.S. Cl.
CPC ............. *H02K 5/124* (2013.01); *F04D 25/06* (2013.01); *H02K 5/1732* (2013.01); *H02K 7/083* (2013.01)

(58) Field of Classification Search
CPC ...... H02K 5/124; H02K 5/1732; H02K 7/083; F04D 25/06
(Continued)

(56) References Cited

U.S. PATENT DOCUMENTS 6,919,569 B2   7/2005 Homme et al.
7,375,446 B2 * 5/2008 Suzuki .................. F16K 27/029
                                                            310/90
(Continued)

FOREIGN PATENT DOCUMENTS

DE        10034302 A1    2/2002
DE      102013014143 A1  6/2014
(Continued)

OTHER PUBLICATIONS

International Search Report and Written Opinion of the International Searching Authority, issued in PCT/EP2019/067178, dated Sep. 20, 2019; ISA/EP.

(Continued)

*Primary Examiner* — Terrance L Kenerly
(74) *Attorney, Agent, or Firm* — Harness, Dickey & Pierce, P.L.C.

(57) ABSTRACT

A motor assembly has an outer stator (40), a rotor assembly (30), a separating can (50), and a first bearing (36) and a second bearing (37). The rotor assembly (30) has an inner rotor (32) and a shaft (31) and defines an axial direction (77) and a radial direction (78) of the motor assembly (20). The motor assembly (20) has a magnetic air gap (53) between the outer stator (40) and the inner rotor (32). The separating can (50) has a split tube component (51) and a separating can base part (52). The split tube component (51) has a split tube section (54). The split tube section (54) extends through the magnetic air gap (53). The outer stator (40) is arranged around the split tube section (54). The split tube section (51)

(Continued)

and the separating can base part (52) overlap in a first predefined axial region (55). A seal (60) is provided between the split tube section (51) and the separating can base part (52) in the first predefined axial region (55).

25 Claims, 11 Drawing Sheets

(51) Int. Cl.
*F04D 25/06* (2006.01)
*H02K 5/173* (2006.01)
*H02K 7/08* (2006.01)

(58) Field of Classification Search
USPC .......................................................... 310/86
See application file for complete search history.

(56) References Cited

U.S. PATENT DOCUMENTS

| | | |
|---|---|---|
| 8,083,500 B1 | 12/2011 | Lebkuchner et al. |
| 9,887,603 B2 | 2/2018 | Damm et al. |
| 2013/0177405 A1 | 7/2013 | Legros et al. |

FOREIGN PATENT DOCUMENTS

| | | |
|---|---|---|
| EP | 1372248 A2 | 12/2003 |
| EP | 2607710 A1 | 6/2013 |
| GB | 799855 A | 8/1958 |
| JP | 2011094577 A | 5/2011 |
| WO | WO-9200627 A1 | 1/1992 |
| WO | WO-2018047602 A1 | 3/2018 |

OTHER PUBLICATIONS

Search report from counterpart German Patent Application No. 102018115952.8 dated Jul. 15, 2020.

\* cited by examiner

MOTOR ASSEMBLY WITH A SEPARATING CAN

CROSS-REFERENCE TO RELATED APPLICATIONS

This application is a 371 U.S. National Phase of International Application No. PCT/EP2019/067178, filed Jun. 27, 2019, which claims priority to German Patent Application No. 10 2018 115 952.8, filed Jul. 2, 2018. The entire disclosures of the above applications are incorporated herein by reference.

FIELD

The disclosure relates to a motor with a separating can.

BACKGROUND

A separating can be used in the structural design of an electric motor. A separating can preferably be used to achieve a seal between an inner space and an outer space. This can be required, for example, if a pump is to deliver an aerosol containing combustible ingredients.

It is an object of the disclosure to provide a new motor having a separating can. This object is achieved by a motor assembly having an outer stator, a rotor assembly, a separating can, and a bearing assembly with a first bearing and a second bearing. The rotor assembly has an inner rotor and a shaft and defines an axial direction and a radial direction of the motor assembly. The motor assembly has a magnetic air gap between the outer stator and the inner rotor. The separating can has a split tube section and a separating can base part. The split tube section has a split tube region. The split tube region extends through the magnetic air gap. The outer stator is disposed about the split tube region. The split tube section and separating can base part overlap in a first predefined axial region. A seal is provided in the first predefined axial region. The split tube section and the separating can base part.

An overlap of the split tube section and the separating can base part makes it easier and more reliable to provide a seal between these parts. As can be derived from the dependent claims, the seal can comprise a sealing member or it can be configured as an integral joint of the two parts. The existence of a seal does not say anything about the exact quality of the seal or its sealing effect. This depends on the intended use. The IP 54 protective system can for example be sufficient to protect electric devices against dust and splash water. But IP 68 or higher may be required for protection from discharge of explosive aerosols.

According to a preferred embodiment, the separating can base part has a first bearing seat. A first bearing is provided in the first bearing seat. This provides easy installation of the first bearing in the region of the separating can base part.

According to a preferred embodiment, the split tube section has a second bearing seat. A second bearing is provided in the second bearing seat. This provides easy installation of the second bearing in the region of the split tube section. Also, the number of installation steps can be kept low.

According to a preferred embodiment, at least sections of the separating can base part are disposed radially outside the split tube section in a first predefined axial region. The split tube section can thereby extend radially outside the split tube section. It defines an additional housing section, for example, for the stator.

According to a preferred embodiment, the inner rotor and the first bearing are spaced apart from each other. Thus, a second axial region is provided between the inner rotor and the first bearing. The first predefined axial region is in the axial direction completely or partially provided in the second predefined axial region. This enables a short design of the separating can.

According to a preferred embodiment, the split tube section has an axial end facing the separating can base part. The rotor assembly extends on both axial sides of the axial end. The extension of the rotor assembly on both sides simplifies the installation and design of the rotor can part. Thus, the rotor can contact the rotor assembly when installed outside the split tube section.

According to a preferred embodiment, the split tube section or the separating can base part has an annular section. The outer surface of the outer stator is connected to the annular section. Preferably, it is connected by a press-fit connection, an adhesive bond, or a screwed connection. The connection of the outer stator to one of the parts advantageously reduces the number of required components.

According to a preferred embodiment, the seal comprises a sealing member that is formed as a layer of an elastomeric material connected to the separating can base part. The sealing member can be produced well and repeatably. The seal does not require an additional process step during assembly for adding a separate sealing member.

According to a preferred embodiment, the sealing member is configured as an injection molded member. It can be configured as an injection molded member efficiently and with low tolerances.

According to a preferred embodiment, the seal comprises a sealing member. The split tube section has split tube section projections on its outer surface. The outer stator has a stator core, a winding assembly, and a molded part. The molded part has a plurality of molded part projections. The motor assembly defines a sealing member space in the first predefined axial region. The sealing member space is radially inwards at least in sections defined by the split tube. The sealing member space is radially outwards at least in sections defined by the separating can base part. The sealing member space is at least in sections defined on a first axial side by the separating can base part. The sealing member space is at least in sections defined on a second axial side situated opposite the first axial side by the split tube section projections or at least in sections by the molded part projections. The sealing member is disposed in the sealing member space.

This embodiment advantageously defines a sealing member space where a sealing member can be provided. It also allows installation of the sealing member in a favorable manner. The second axial side can thus likewise be defined, at least in sections, by both the split tube section projections and the molded part projections.

According to a preferred embodiment, the sealing member has a sealing ring. Sealing rings are advantageous for circumferential sealing between components.

According to a preferred embodiment, the sealing member comprises an O-ring, an X-ring, or a V-ring. These types of sealing members achieve good sealing in the present embodiment.

According to a preferred embodiment, the sealing member has a support ring. The support ring adjoins the split tube section projections or molded part projections at least in sections on the second axial side of the sealing member space. The sealing ring is disposed between the support ring and the first axial side of the sealing member space. A support ring results in a more uniform pressure applied to the sealing ring if the sealing member space is not completely uniform. This can increase the sealing effect.

According to a preferred embodiment, the sealing member is pressed in the radial direction into the sealing member space, at least in sections. Pressing increases the sealing effect.

According to a preferred embodiment, the molded part is configured as a stator end disk or as a stator encapsulation. The shape of the molded part can be produced with very low tolerances. Also, the shape is in the desired design for such molded parts.

According to a preferred embodiment, the molded part is additionally configured as an insulating body, at least onto sections where the winding assembly is wound. The molded part can thus also act as an insulating part. No additional process steps are needed to produce an insulation.

According to a preferred embodiment, the molded part is configured as a substrate for a winding connection. Due to this design, the molded part can be used for disposing a winding connection and implement an additional function.

According to a preferred embodiment, the outer stator has stator grooves on its inner surface. The stator grooves are configured to allow sliding of the outer stator onto the split tube section. This occurs moving the split tube section projections in the stator grooves during assembly of the motor assembly. The stator is thus aligned by means of the split tube section projections.

According to a preferred embodiment, the split tube section projections are formed as ribs. This ribs extend in the axial direction into the region of the stator grooves to enable alignment of the outer stator relative to the split tube section. Alignment is thus possible over the range of movement.

According to a preferred embodiment, a split tube section projection is disposed at least in sections of each stator groove. This results in an equal distribution of forces.

According to a preferred embodiment, the outer stator comprises pronounced stator poles with stator pole heads. The split tube section projections engage in the region of the stator grooves between the stator pole heads. This yields an advantageous design where the stator can be aligned by the stator pole heads.

According to a preferred embodiment, the seal is configured as an adhesive bond with an adhesive. The adhesive connects the split tube section and the separating can base part to each other. Use of an adhesive makes it possible to produce a seal without an additional molded sealing member.

According to a preferred embodiment, the seal is configured as a welded connection. The welded connection connects the split tube section and the separating can base part to each other. Welded connections can also be produced without an additional sealing member. Moreover, welded connections can be made very tight.

According to a preferred embodiment, the separating can base part forms a groove at least in sections. The groove engages in the split tube section. The groove is preferably configured as a circumferential groove. The groove enables easy installation for various seals. Also, alignment is easier when joining the components. Alternatively, such a groove can also be formed on the axial end of the split tube section.

According to a preferred embodiment, a pump assembly comprises a motor assembly according to the above embodiments. Such a pump assembly can be well sealed well by the motor assembly. The region of the inner rotor does not need to be sealed towards the region of the impeller.

DRAWINGS

The drawings described herein are for illustrative purposes only of selected embodiments and not all possible implementations, and are not intended to limit the scope of the present disclosure.

Further details and advantageous further developed embodiments of the disclosure can be derived from the exemplary embodiment described below and shown in the drawings, which should in no way be interpreted as limiting the invention, and from the dependent claims. Wherein:

DETAILED DESCRIPTION

Terms such as top, bottom, left, and right hereinafter refer to the respective view and may differ from figure to figure.

Figure 1:
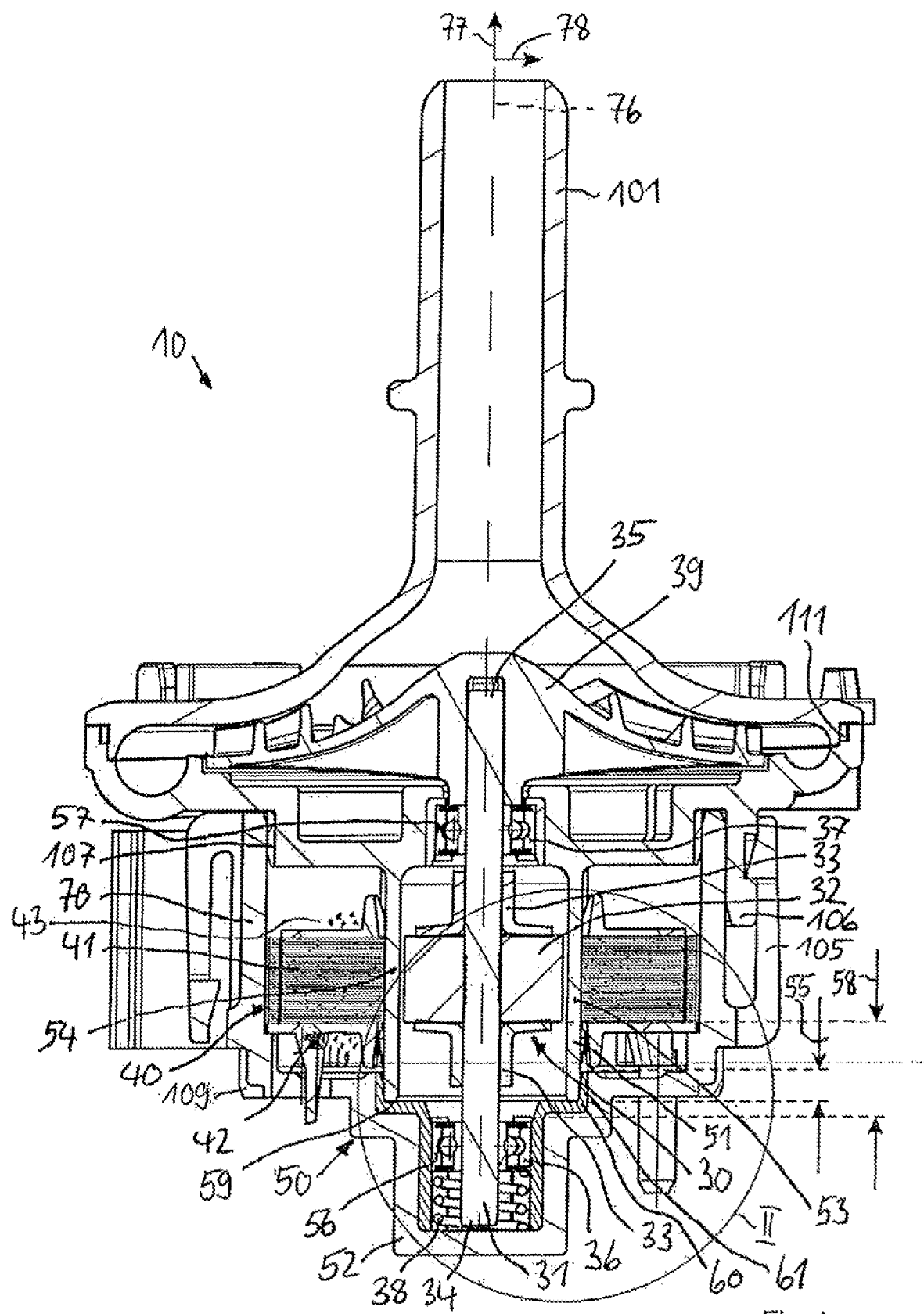
FIG. 1 is a longitudinal section view of a motor assembly.
Figure 2:
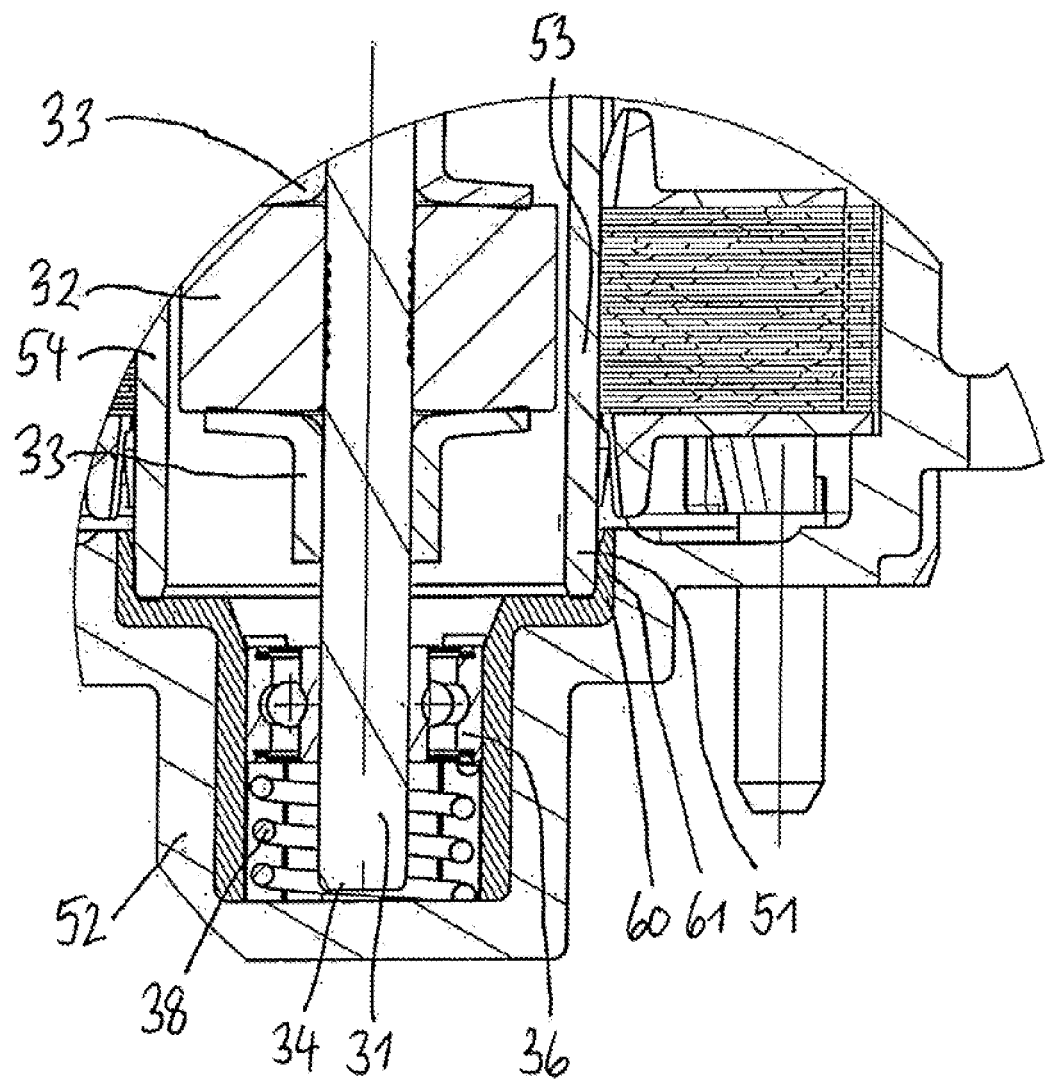
FIG. 2 is a cross-sectional view of a detail II of FIG. 1.

FIG. 1 illustrates a pump assembly 10 with a motor assembly 20. FIG. 2 shows the detail II of FIG. 1. The motor assembly 20 drives an impeller 39 via a shaft 31 to achieve a pumping effect.

The motor assembly 20 has an outer stator 40, a rotor assembly 30, a separating can 50, and a bearing assembly 36, 37 with a first bearing 36 and a second bearing 37. The rotor assembly 30 has an inner rotor 32 and a shaft 31. An axial direction 77 and a radial direction 78 of the motor assembly 20 are defined by rotating the rotor 32 about an axis of rotation 76 predefined by the bearing assembly 36, 37. The shaft 31 has a first axial end 34 and a second axial end 35.

The motor assembly 20 has a magnetic air gap 53 between the outer stator 40 and the inner rotor 32. An air gap in the context of magnetic circuits in electrical engineering is the space or distance between two opposite surfaces which carry a magnetic flux. In the present case the gap is the space between the inner rotor 32 and the outer stator 40 of the motor assembly 20. The air gap must therefore not be an area with air. Instead, it is a magnetically poorly conducting space where vacuum, air, plastic, or another poor or not well conducting magnetic conductor can be provided.

The outer stator 40 has a stator core 41. The core 41 may, for example, be formed as a sheet package. The outer stator 40 also has a schematically outlined winding assembly 43.

The separating can 50 has a split tube section 51 and a separating can base part 52. Thus, it has a multi-part structure. The split tube section 51 has a split tube region 54, that extends through the magnetic air gap 53. The outer stator 40 is disposed around the split tube region 54. In other words, the outer stator 40 is situated radially outside the split tube region 54.

The split tube section 51 and the separating can base part 52 overlap in a first predefined axial region 55. The first predefined axial region 55 is indicated by two arrows. The split tube section 51 and the separating can base part 52 therefore both extend into this first predefined axial region 55. In the first predefined axial region 55, a seal 60, in the form of a sealing member 61, is provided between the split tube section 51 and the separating can base part 52. In the exemplary embodiment, the separating can base part 52 is provided on the outer surface of the sealing member 61. The split tube section 51 is situated on the inner surface of the sealing member 61. But it is also possible to provide the split tube section 51 outside and the separating can base part 52 inside the sealing member 61, or to provide the separating can base part 52 both inside and outside the split tube section 51, or vice versa.

The separating can base part 52 has a first bearing seat 56 where the first bearing 36 is provided in the first bearing seat 56. A force is applied to the first bearing 36 by a spring member 38. Alternatively, a force can be applied by a spring member to the second bearing 37.

Providing the first bearing seat 56 in the separating can base part 52 has the advantage that it simplifies the installation. The first bearing 36 can be installed together with the separating can base part 52. Moreover, the size of the bearing seat can be varied by a respective design of the separating can base part 52.

The separating can base part 51 has a first bearing seat 57 in which the first bearing 37 is provided in the second bearing seat 57. Due to the multi-part design of the separating can 50, the second bearing 37 can be inserted from below into the split tube section 51. This is due to an open axial end 59 before the separating can base part 52 is installed. In other words, it can be inserted from the axial end 59. This is advantageous compared to a single-part separating can. Here the top opening in a single-part separating can must be big enough to insert the rotor. This means that either large second bearings must be used or that additional parts must be installed after inserting the rotor 30.

The separating can base part 52 is preferably, at least in sections, disposed radially outside the split tube section 51 in the first predefined axial region 55. This enables an advantageous design in that the separating can base part 52 and likewise defines the outer space for the outer stator 40. As can be seen, for example, in FIG. 7, another region of the separating can base part 52 can additionally be situated radially inside. But a reverse solution is conceivable as well.

In the exemplary embodiment, the inner rotor 32 and the first bearing 36 are spaced apart from each other. Thus, a second axial region 58 is provided between the inner rotor 32 and the first bearing 36. This enables a short design of the separating can 50.

The split tube section 51 has an annular section 70. Preferably the outer surface of the outer stator 40 is connected to the annular section 70. This design is advantageous, since the split tube region 54 is preferably formed as small as possible to keep the magnetic resistance low. The annular section 70, however, can be thicker to enable secure fastening of the outer stator 40. The annular section 70 can alternatively be formed as a region of the split tube section 51 or as an additional housing part.

The sealing member 61 is formed as a layer of an elastomeric material connected to the separating can base part 52. Joining the split tube section 51 and the separating can base part 52 produces a compression or pressing of the sealing member 61 in the first predefined axial region 55.

In applications where an air/gas mixture is delivered by the pump assembly 10, tightness in the region of the sealing member 61 is important. In the use case mentioned, a maximum pressure difference of 0.2 bar is assumed. The required tightness was easily achieved with the exemplary embodiment shown. The embodiment shown is also suited for higher pressure differences.

The separating can base part 52 preferably includes plastic as its material. It is further preferably formed of plastic. The sealing member 61 is preferably formed of an elastomeric material (elastomer). The sealing member 61 can preferably be produced by an injection molding method. A multi-component injection molding method is well-suited. In the present case a 2-component injection molding method is used. It is preferred that the separating can base part 52 is injection molded first, for example, of a thermoplastic material. The sealing member 61 is molded thereto, preferably of an elastomeric material.

The embodiment shown where the sealing member 61 is applied as a layer to the separating can base part 52 has the advantage that only one component is needed for installation in this region.

Figure 3:
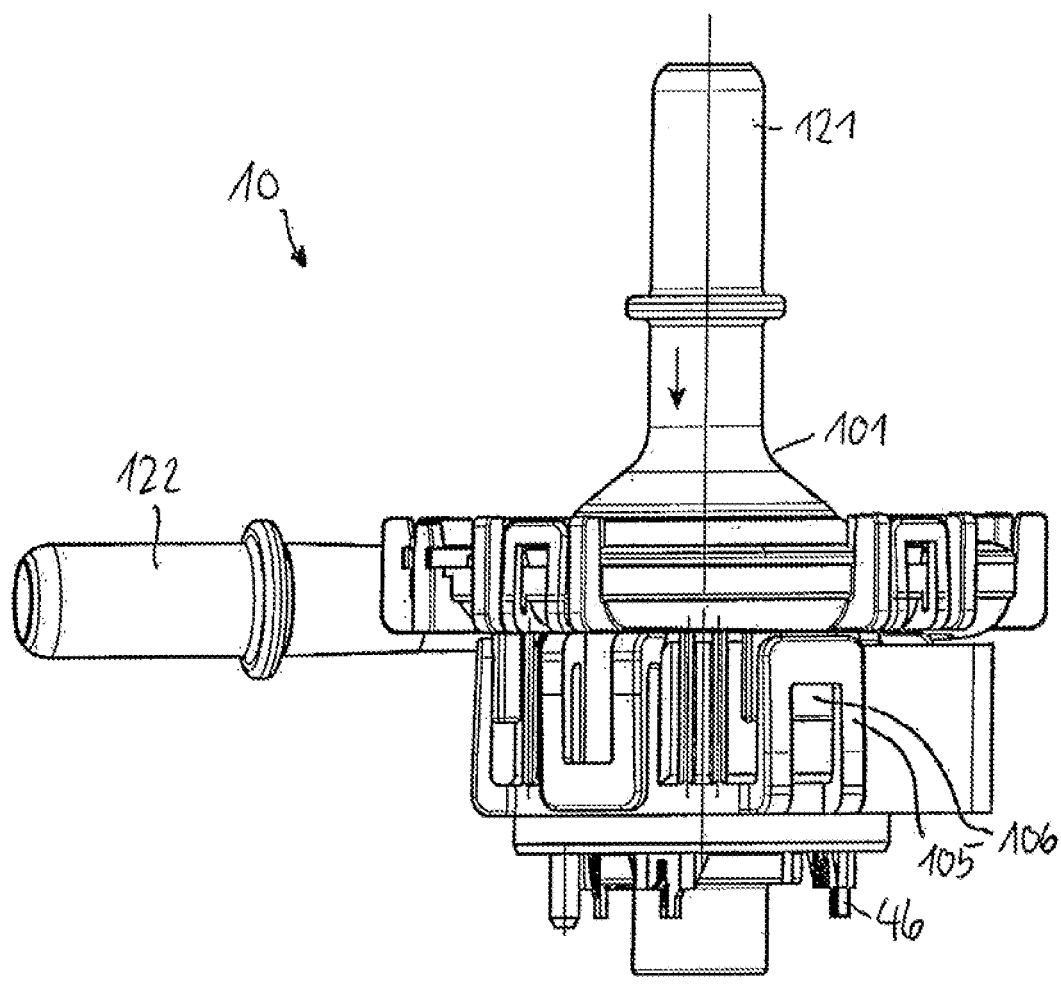
FIG. 3 is a side elevation view of a motor assembly.

FIG. 3 shows a second exemplary embodiment of the pump assembly 10 in a side view from outside. The pump cover 101 has an inlet 121 and an outlet 122.

Figure 4:
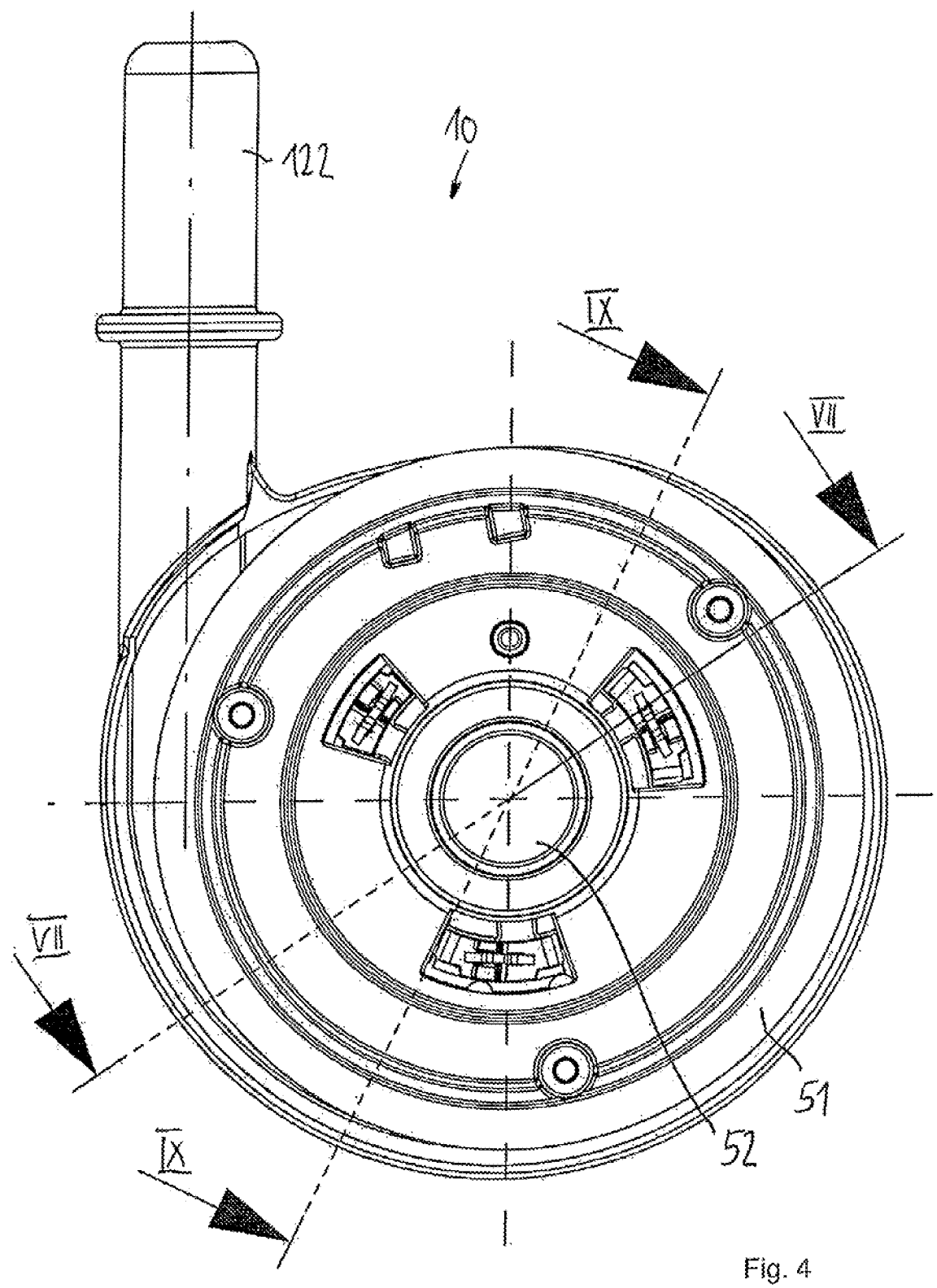
FIG. 4 is a plan view of the motor assembly from FIG. 3 along the arrow IV of FIG. 3.

FIG. 4 shows a plan view of the pump assembly 10 of FIG. 3 along the arrow IV of FIG. 3.

Figure 5:
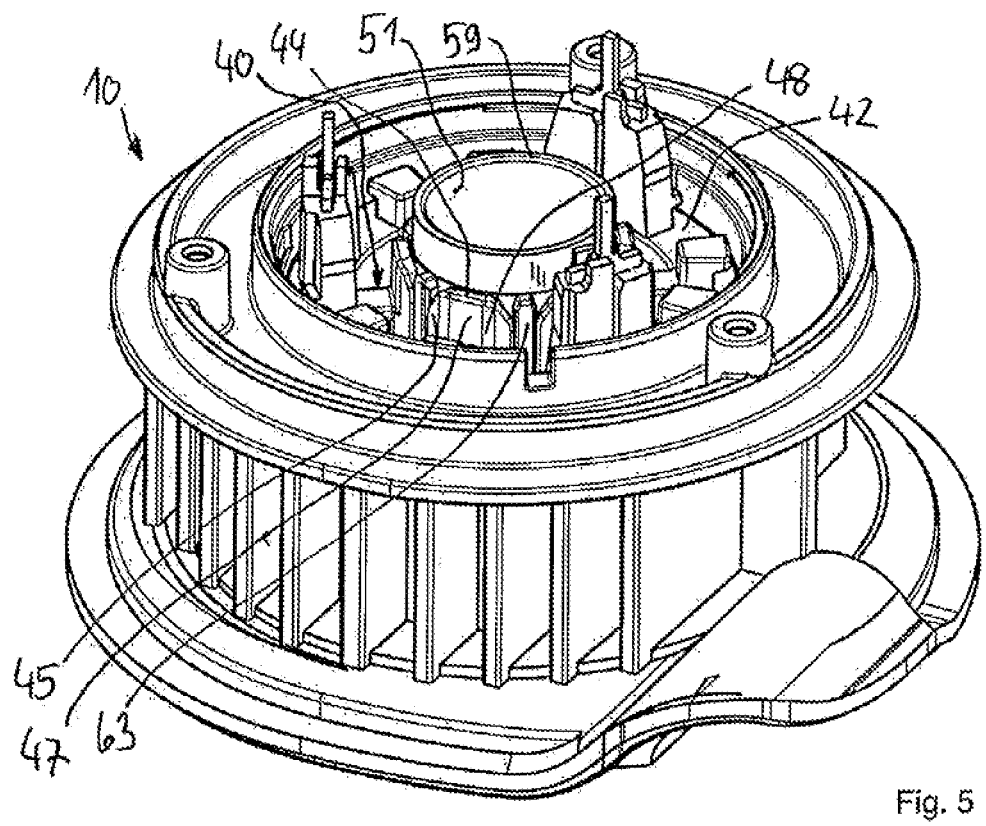
FIG. 5 is a perspective view of a part of the motor assembly of FIG. 1.

FIG. 5 shows an oblique detailed view of the pump assembly 10 of FIG. 3, without the separating can base part 52 and without the rotor assembly 30. The outer stator 40 has stator poles 47. They can also be called pronounced stator poles 47. The stator poles 47 have stator pole heads 48. The split tube section 51 has split tube section projections 63 on the outer surface, that is the outside of its shell surface. The molded part 42 has a plurality of molded part projections 44, that extend towards the axial end 59 of the split tube section 51 until they are close thereto.

Figure 8:
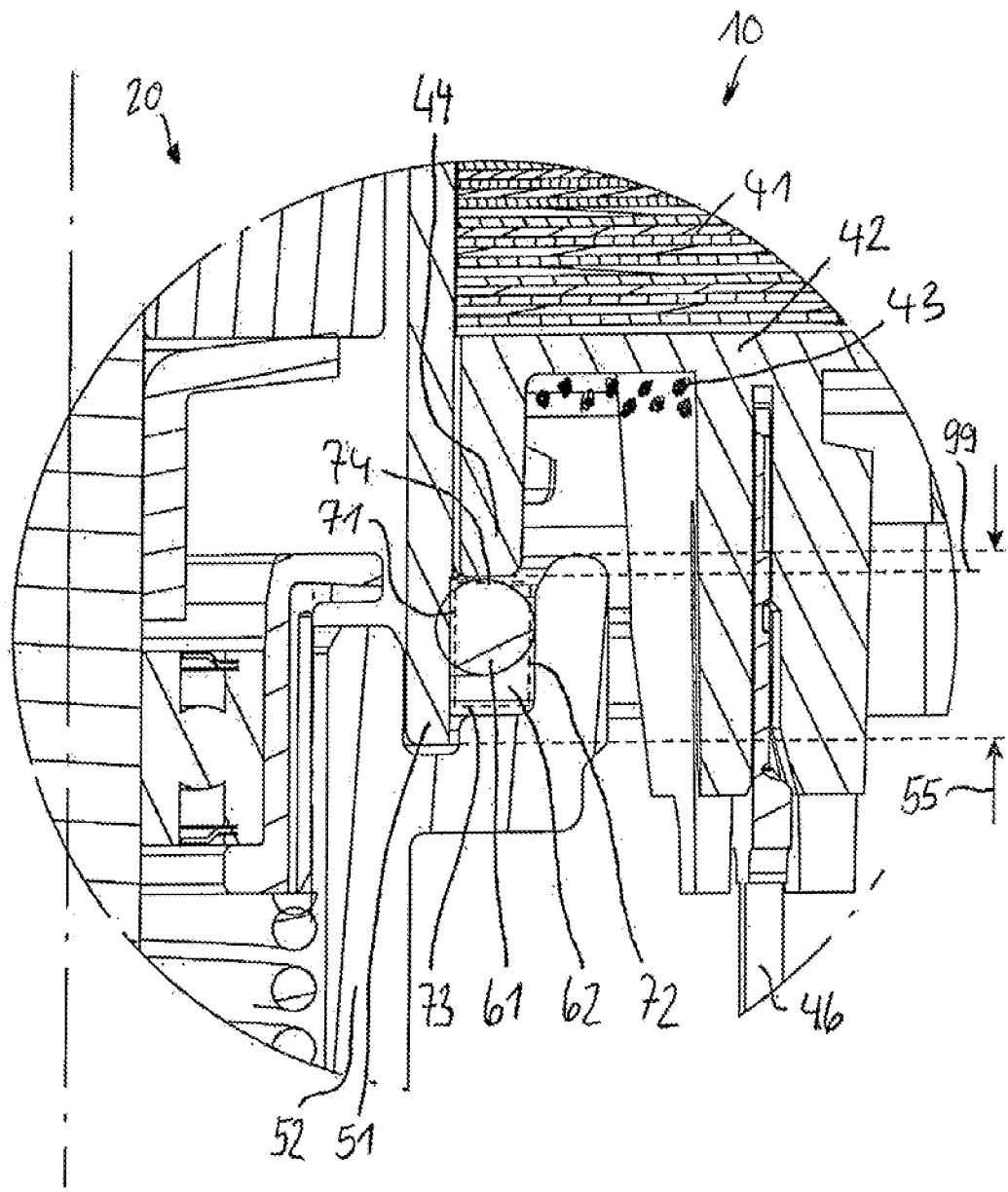
FIG. 8 is cross-sectional view of a detail VIII of FIG. 7.
Figure 10:
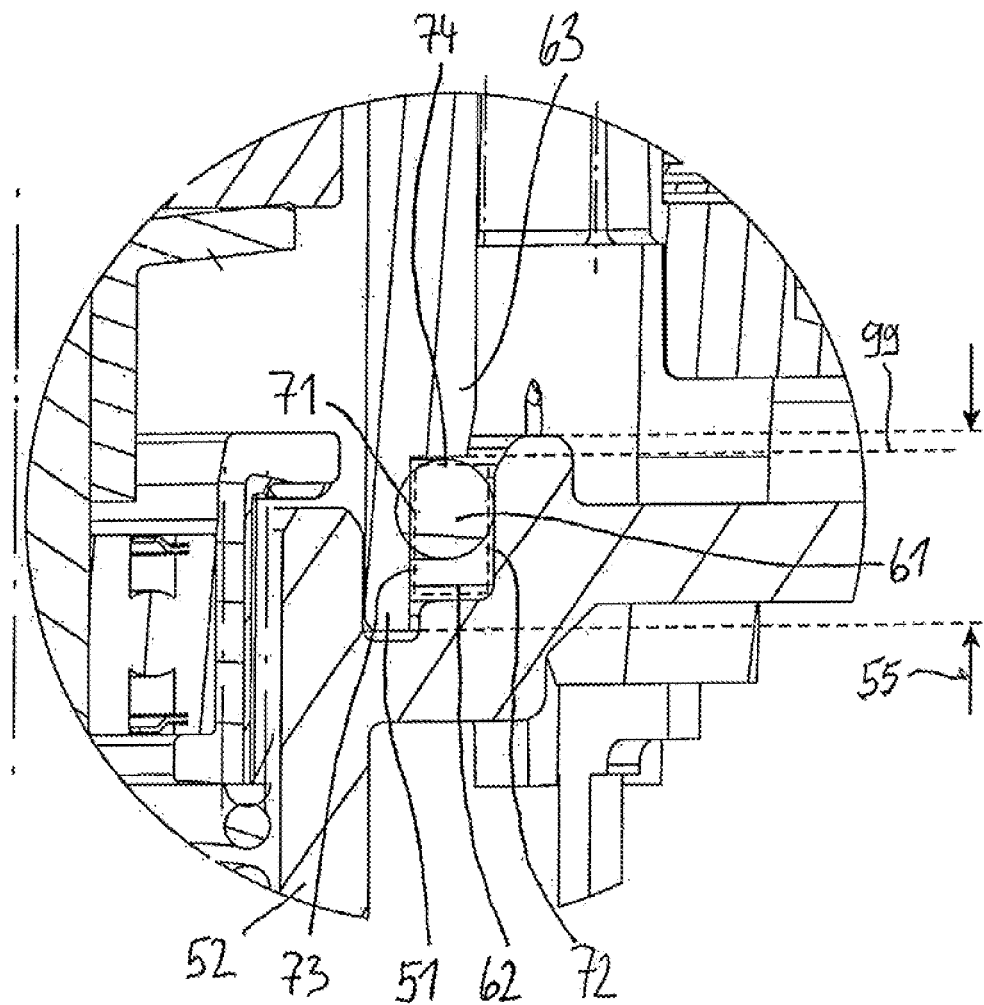
FIG. 10 is a cross-sectional view of a detail X of FIG. 9.

The molded part projections 44 and the split tube section projections 63 preferably define a common plane 99 near the axial end 59 of the split tube section 51, see FIGS. 8 and 10. Small deviations or manufacturing tolerances are non-critical, however.

The molded part projections 44 are preferably disposed such that the stator grooves 45, particularly the stator grooves 45 in the region between the stator pole heads 48, are guided by the molded part projections 44 during installation and can thereby be positioned.

The split tube section projections 63 are preferably formed as ribs. The ribs extend in the axial direction into the region of the stator grooves 45. This enables alignment of the outer stator 40 relative to the split tube section 51, even after installation.

Figure 6:
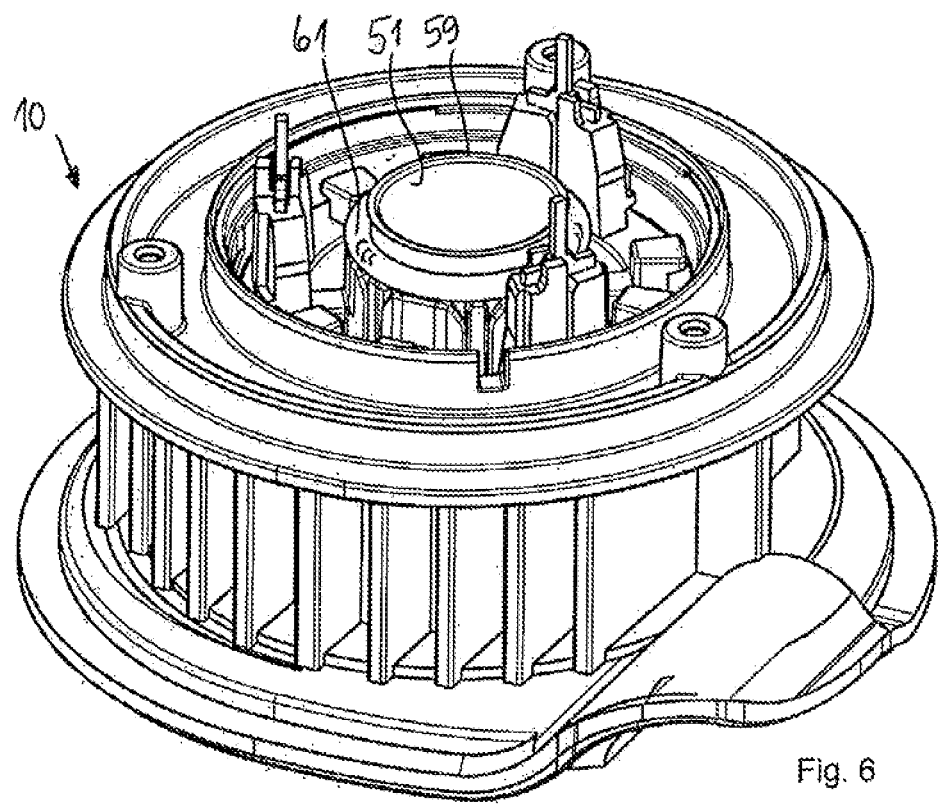
FIG. 6 is a perspective view of the motor assembly according to FIG. 5 with a sealing member.

FIG. 6 shows a detailed view according to FIG. 5. A sealing member 61, in the form of a sealing ring is additionally disposed on the split tube section 51. Sliding on the sealing member 61 is axially limited in the exemplary embodiment by the molded part projections 44 and the split tube section projections 63. The sealing member 61 preferably rests against both the split tube section projections 63 and the molded part projections 44.

Figure 7:
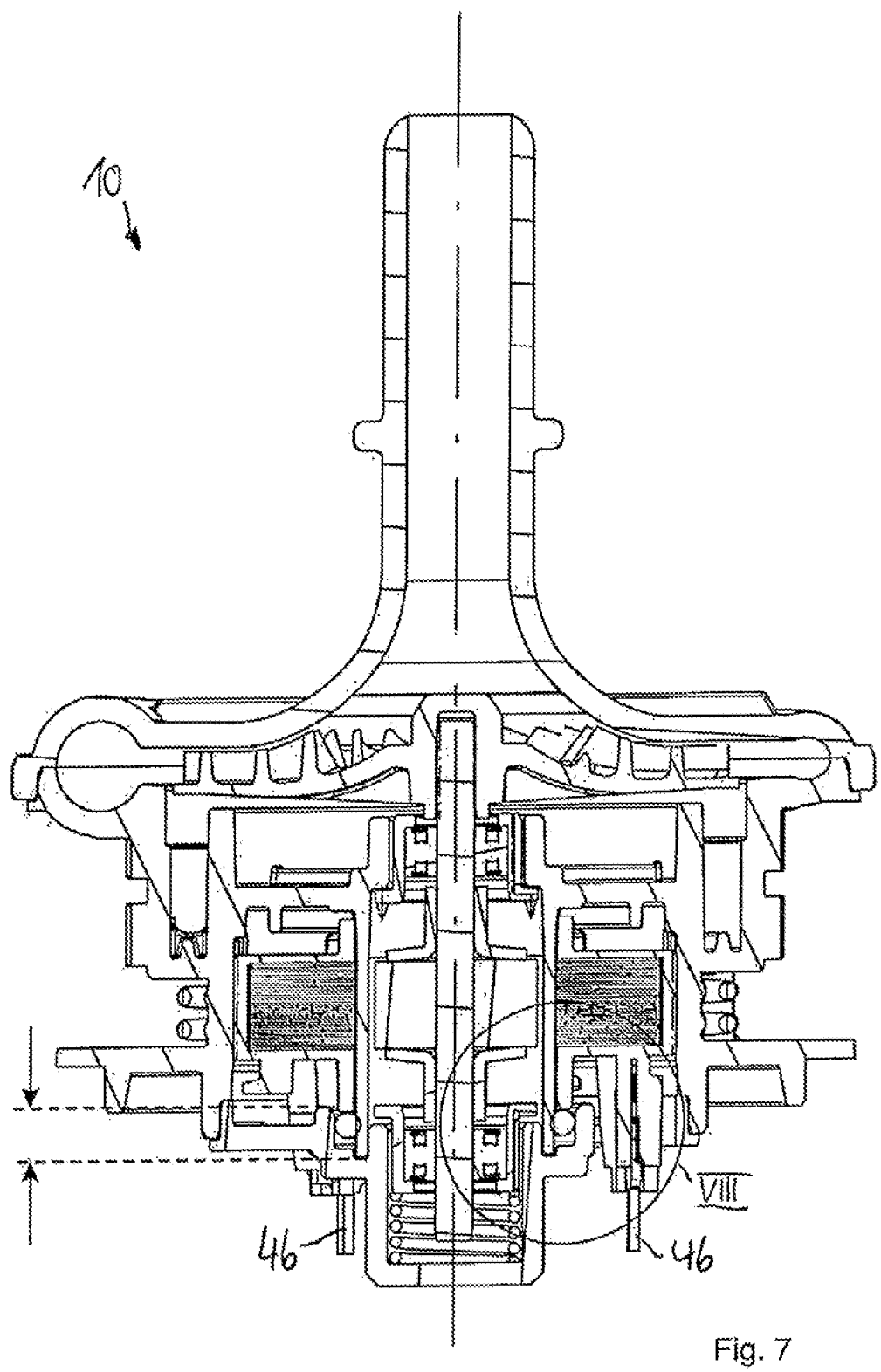
FIG. 7 is a cross-sectional view along the section line VII-VII of FIG. 4.

FIG. 7 shows a longitudinal section through the pump assembly 10 of FIG. 3 along the section line VI-VI of FIG. 4.

FIG. 8 shows the detail VIII of FIG. 7. A sealing member space 62 is defined in the first predefined axial region 55, where the split tube section 51 and the separating can base part 52 overlap. The sealing member space 62 is shown as a dashed line. The sealing member space 62 is in sections or completely defined radially inwards (71) by the split tube section 51, in sections or completely defined radially outwards (72) by the separating can base part 52, in sections or completely defined on a first axial side 73 by the separating can base part 52, and in sections or completely defined on a second axial side 74 situated opposite the first axial side 73 by the molded part projection 44.

The sealing member 61 is disposed in the sealing member space 62. It is shown in its original form, that is, before it is slid onto the split tube section 51 and before the separating can base part 52 is installed. The sealing member space 62 does not have to be fully defined on all sides 71, 72, 73, 74. It is, for example, sufficient if there are gaps but these gaps are so small that the sealing member 61 cannot be moved out of the sealing member space 62.

As can be seen, the sealing member 61 has a greater radial extension in its original form than the radial extension between the sides 71, 72 of the sealing member space 62. The sealing member 61 is therefore compressed during installation in the sealing member space 62. This results in improved tightness between the split tube section 51 and the separating can base part 52.

The molded part 42, as it is shown, can be formed as a stator end disk or stator encapsulation. When it is formed as stator end disk, the molded part 42 can be produced and then slid onto the stator core. When it is formed as a stator encapsulation, the stator core is preferably coated fully or in part with a plastic material, where the molded part 42 is formed.

The molded part 42 is preferably also configured as an insulating body. This is at least onto sections where the schematically outlined winding assembly 43 can be wound. At least sections of the molded part are therefore situated between the winding assembly 43 and the stator core 41. The molded part 42 is preferably also configured as a substrate for a winding connection 46, for example for a pin.

Figure 9:
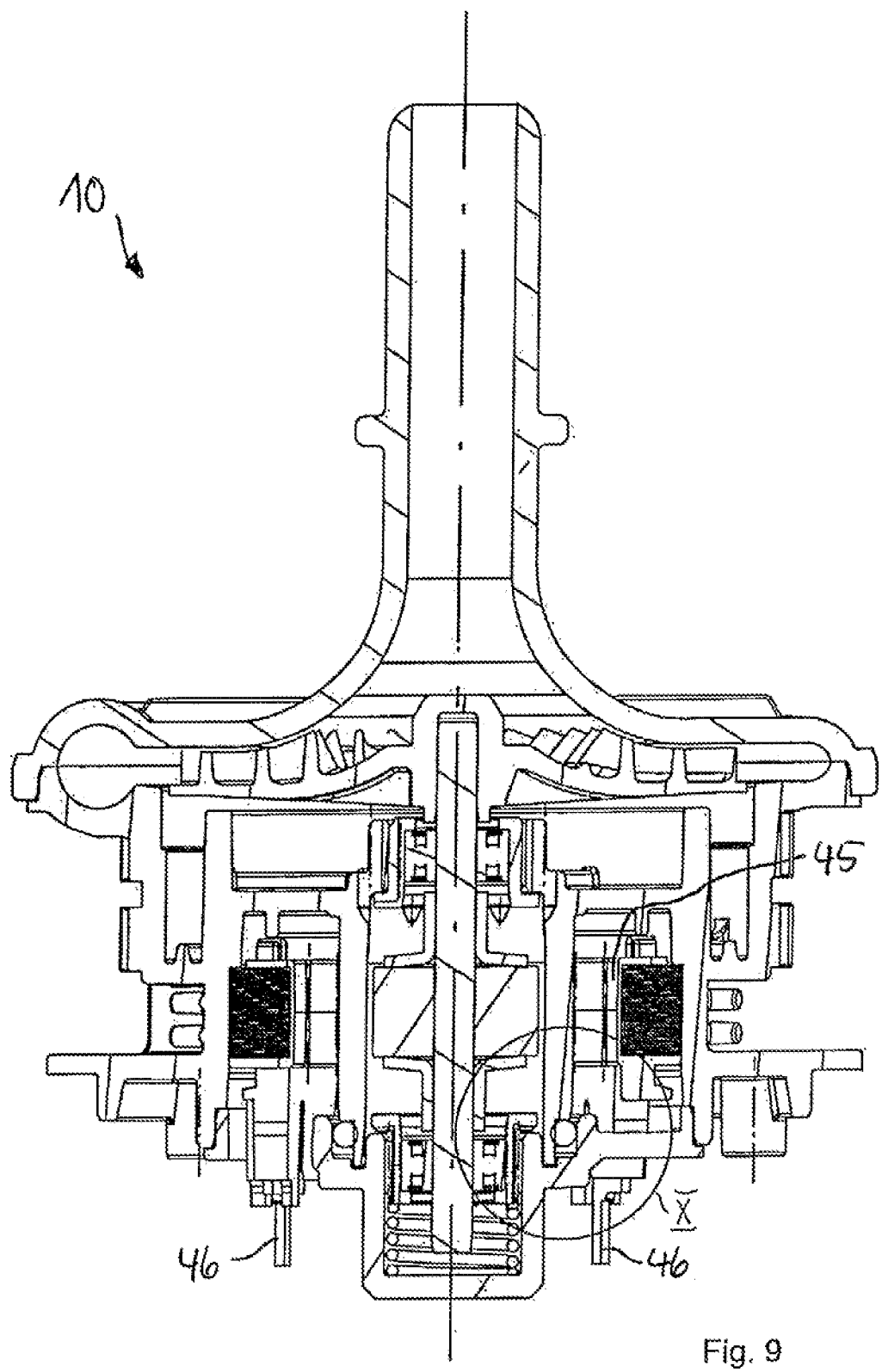
FIG. 9 is a cross-sectional view along the section line IX-IX of FIG. 4.

FIG. 9 shows a longitudinal section through the pump assembly 10 of FIG. 3 along the section line VIII-VIII of FIG. 4.

FIG. 10 shows the detail X of FIG. 9. Like in FIG. 8, the sealing member space 62 is defined in the first predefined axial region 55, where the split tube section 51 and the separating can base part 52 overlap. The sealing member space 62 is shown as a dashed line. The sealing member space 62 is in sections or completely defined radially inwards (71) by the split tube section 51, in sections or completely defined radially outwards (72) by the separating can base part 52, in sections or completely defined on a first axial side 73 by the separating can base part 52, and in sections or completely defined on a second axial side 74 situated opposite the first axial side 73 by the molded part projection 63.

The sealing member 61 is disposed in the sealing member space 62 like in FIG. 8, and the statements referring to FIG. 8 apply here as well.

It is a specialty of this embodiment that the sealing member space 62 is defined in sections on the axial side 74 in the circumferential direction by the molded part projections 44 (FIG. 8) and in sections by the split tube section projections 63 (FIG. 10).

If the sealing member space 62 were instead only defined by the molded part projections 44, the sealing member 61 could be pressed out of the sealing member space in the gaps between the molded part projections 44. Thus sealing could potentially be poor, since the fluid to be delivered could flow out of the pump chamber or rotor space, respectively.

The sealing member 61 is configured as a sealing ring in the exemplary embodiment shown. More precisely, it is an O-ring having a round cross section in its original form. Alternatively, configurations as an X-ring with an X-shaped cross section or as a V-ring with a V-shaped cross section are conceivable.

In the exemplary embodiment shown in FIG. 3 to FIG. 9, sealing between the split tube section 51 and the separating can base part 52 could be implemented using a design with a sealing member 61 as shown in FIG. 1.

In the embodiment shown in FIG. 3 to FIG. 9, unlike the embodiment of FIG. 1, the annular section 70 is formed as a portion of the split tube section 51. The outer surface of the outer stator 40 is preferably pressed into the annular section 70. Another type of fastening is possible, for example by gluing or welding. These variants have the advantage that no additional component has to be provided for sealing. This is called an integral joint.

Figure 11:
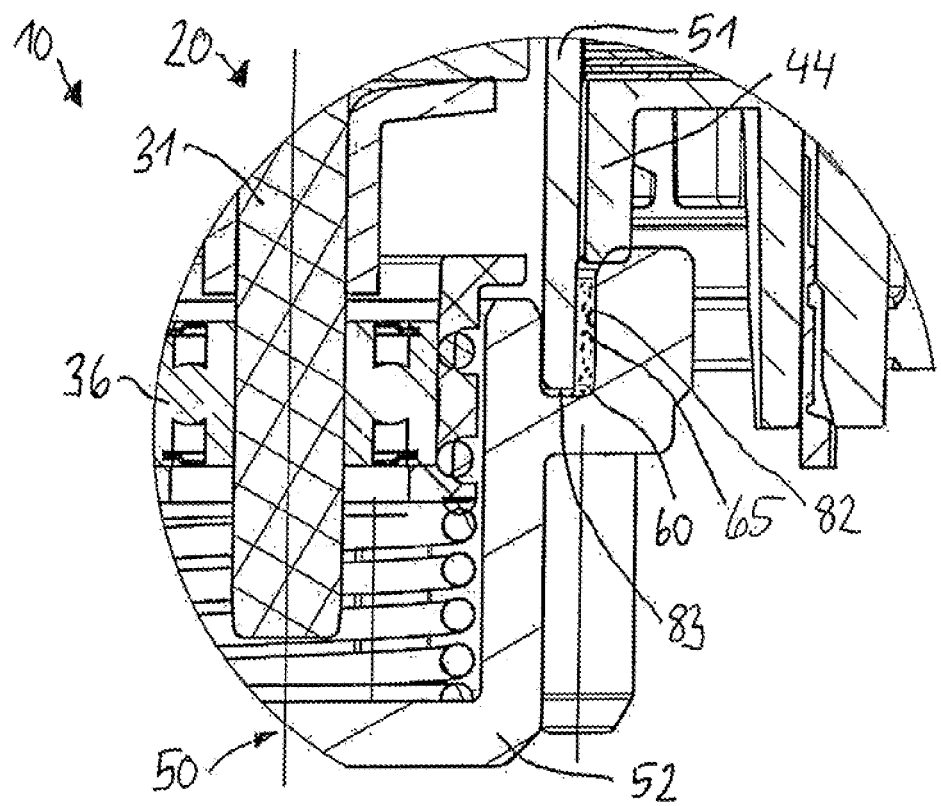
FIG. 11 is a cross-sectional detailed view according to FIG. 8 of another embodiment of a seal.

FIG. 11 shows a detail of the region between the split tube section 51 and the separating can base part 52 according to the excerpt from FIG. 8. It shows an adhesive bond 65 with an adhesive, for example, a physically curing adhesive or a chemically curing adhesive. Resin-based adhesives are particularly suitable. The adhesive forms a seal between the two parts 51, 52.

It is preferred that a gap 82 is provided at least in sections between the split tube section 51 and the separating can base part 52. This provides a space for an adhesive. Preferably, an axial overlap is provided between the split tube section 51 and the separating can base part 52. The axial overlap can be provided inside, outside, or inside and outside, like in the other exemplary embodiments.

It is preferred that the separating can base part 52, at least in sections, forms a groove 83 that can engage in the split tube section 51. The adhesive for the adhesive bond 65 can then be placed in the groove 83 before the split tube section 51 is inserted into the groove 83. It is further preferred that the gap 82 is provided on the radially outer side of the split tube section 51. The adhesive is thus mainly displaced outwards, and the risk of contaminating the space for the shaft 31 is reduced.

Figure 12:
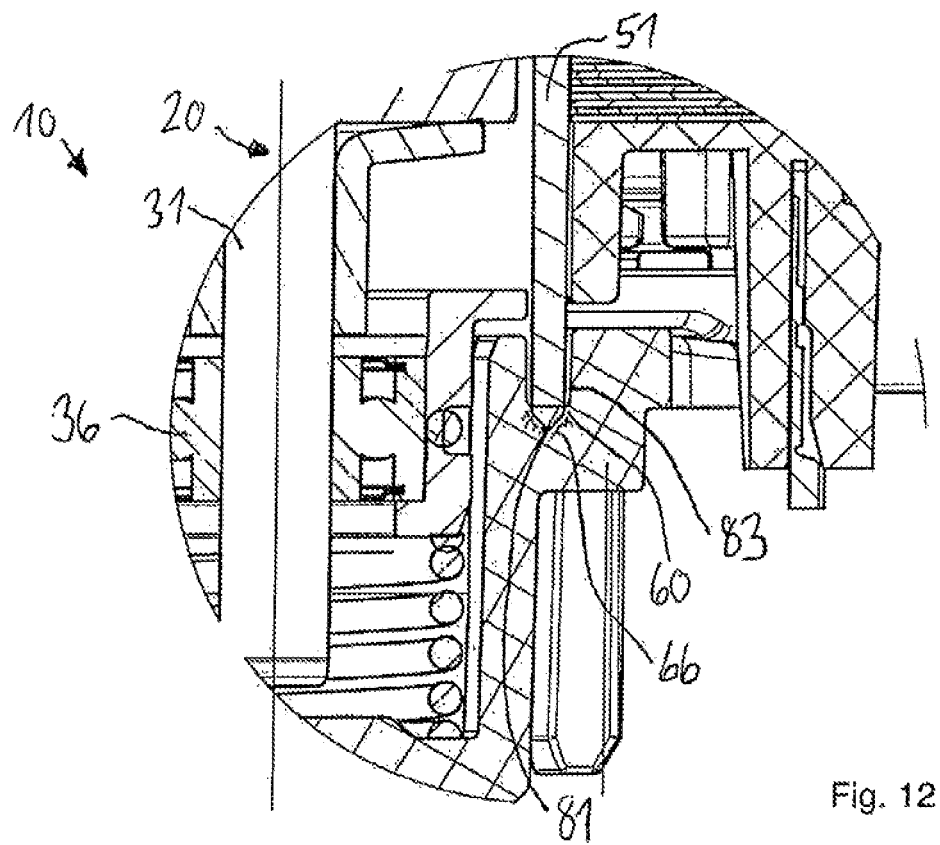
FIG. 12 is a cross-sectional detailed view according to FIG. 8 of another embodiment of a seal.

FIG. 12 shows another seal between the split tube section 51 and the separating can base part 52. It is in the form of a welded connection 66. The welded connection is preferably produced by ultrasonic welding, but other heat-generating methods are conceivable as well.

Like in FIG. 11 and in FIG. 8, a groove 83 is provided where the split tube section 51 extends. The split tube section 51 preferably includes a tip 81 on its end facing the separating can base part. Heat is generated at the tip during ultrasonic welding by a vibration generated by a sonotrode. The heat results in melting the region with the tip 81. In this region there is a linear or point-shaped contact of the components 51, 52. The displaced volume finds room in the groove 83 and will therefore not exit into the inner space of the motor assembly 20. A preferred material for the separating can base part 52 in the context of ultrasonic welding, is a thermoplastic material.

After melting off the plastic material involved, the two components 51, 52 are connected comparatively tightly and mechanically durably. The overall welding path, that is, the path along which the two components 51, 52 are moved together during welding, is for example approximately 0.6 mm. The figure shows the components 51, 52 in their end position where they immerse into each other.

Figure 13:
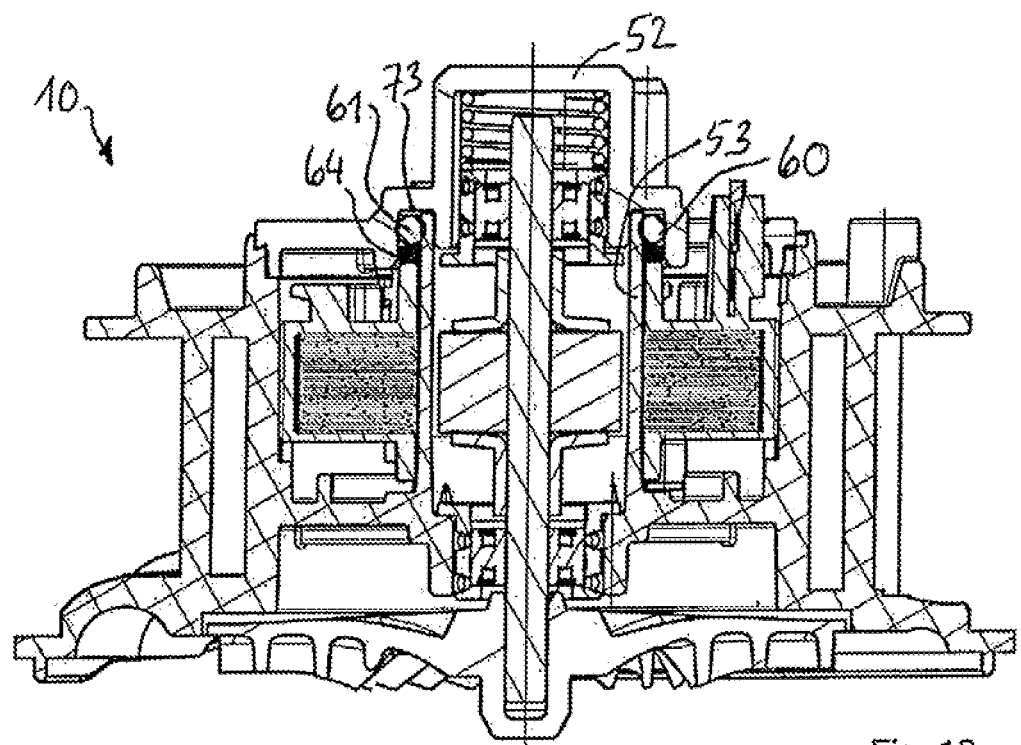
FIG. 13 is a longitudinal cross-section view of another embodiment of the motor assembly.
Figure 14:
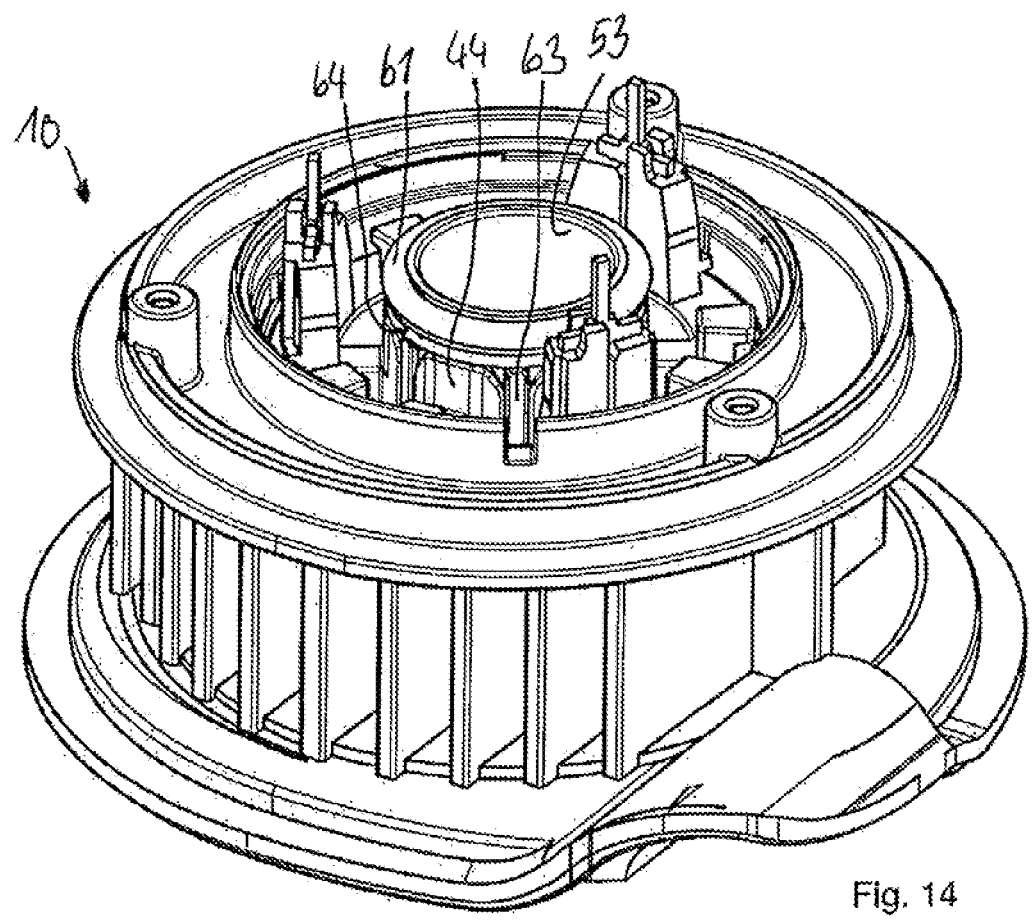
FIG. 14 is a perspective view of the motor assembly of FIG. 13 prior to installation.

FIG. 13 shows a longitudinal sectional view of another exemplary embodiment of the pump assembly 10, and FIG. 14 shows a stereoscopic representation of the exemplary embodiment shown in FIG. 13.

Like in the exemplary embodiment shown in FIGS. 5 to 10, the seal 60 between the split tube section 51 and the separating can base part 52 is formed by a sealing member 61, particularly an O-ring. The sealing member space 62 (see FIG. 8) is additionally defined by a support ring 64. The support ring 64 is used to more evenly distribute the axial pressure onto the sealing member 61. This can be advantageous, for example, if no split tube section projections 63 (see FIG. 10) are provided or if the molded part projections 44 (see FIG. 8) cannot be extended to the sealing member space 62. The support ring can help improve the sealing effect of the seal 60. The sealing effect can also be ensured at a higher pressure difference between the inner space and the outer space.

The support ring 64 can be installed by sliding it onto the split tube section 51 after installing the stator 40. The support ring 64 can for example rest against the molded part projections 44 (see FIG. 8) or against the split tube section projections 63 (see FIG. 10) or against both projections. Subsequently, the sealing member 61 is slid onto the split tube section 51.

Naturally, variations and modifications are conceivable within the scope of the disclosure.

A pump assembly 10 was shown as an exemplary embodiment. But the invention can also be used, for example, for a fan or as a drive for another application.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A motor assembly comprising an outer stator, a rotor assembly, a separating can, and a bearing assembly with a first bearing and a second bearing,
   the rotor assembly has an inner rotor and a shaft and defines an axial direction and a radial direction of the motor assembly,
   the motor assembly includes a magnetic air gap between the outer stator and the inner rotor, the separating can has a split tube section and a separating can base part,
   the split tube section has a split tube region, the split tube region extends through the magnetic air gap, the outer stator is disposed about the split tube region,
   the split tube section and the separating can base part overlap in a first predefined axial region, and
   a seal is provided in the first predefined axial region between the split tube section and the separating can base part;
   the axial region includes a circumferential stepped wall portion defining a cylindrical bore, the seal is positioned within the cylindrical bore of the wall portion and
   the split tube section seats in the cylindrical bore of the stepped wall portion.

2. The motor assembly according to claim 1, wherein the separating can base part has a first bearing seat receiving the first bearing.

3. The motor assembly according to claim 2, wherein the split tube section has a second bearing seat receiving the second bearing.

4. The motor assembly according to claim 1, wherein the separating can base part is disposed in a first predefined axial region at least partially radially outside the split tube section.

5. The motor assembly according to claim 1, wherein the inner rotor and the first bearing are spaced apart from each other, such that a second axial region is provided between the inner rotor and the first bearing, and the first predefined axial region is, in the axial direction, completely or partially provided in the second predefined axial region.

6. The motor assembly according to claim 1, wherein the split tube section has an axial end facing the separating can base part, and the rotor assembly extends on both axial sides of the axial end.

7. The motor assembly according to claim 1, wherein the split tube section or the separating can base part has an annular section, the outer surface of the outer stator is connected to the annular section, preferably by a press-fit connection, an adhesive bond, or a screwed connection.

8. The motor assembly according to claim 1, wherein the seal comprises a sealing member formed as a layer of an elastomeric material connected to the separating can base part.

9. The motor assembly according to claim 8, wherein the sealing member is formed as an injection molded member.

10. The motor assembly according to claim 1, wherein the seal has a sealing member,
    the split tube section has split tube section projections on its outer surface,
    the outer stator has a stator core, a winding assembly, and a molded part,
    the molded part has a plurality of molded part projections, and the motor assembly defines a sealing member space in the first predefined axial region,
    the sealing member space is radially inwards, at least in sections, defined by the split tube section, and is radially outwards, at least in sections, defined by the separating can base part, and is at least in sections defined on a first axial side by the separating can base part, and is at least in sections defined on a second axial side situated opposite the first axial side by the split tube section projections or at least in sections by the molded part projections, and the sealing member is disposed in the sealing member space.

11. The motor assembly according to claim 10, wherein the sealing member comprises a sealing ring.

12. The motor assembly according to claim 11, wherein the sealing member comprises an O-ring, an X-ring, or a V-ring.

13. The motor assembly according to 10, wherein the sealing member has a support ring and a sealing ring, wherein the support ring adjoins the split tube section projections or molded part projections at least in sections on the second axial side of the sealing member space, and wherein the sealing ring is disposed between the support ring and the first axial side of the sealing member space.

14. The motor assembly according to claim 10, wherein the sealing member is pressed in the radial direction into the sealing member space at least in sections.

15. The motor assembly according to claim 10, wherein the molded part is configured as a stator end disk or as a stator encapsulation.

16. The motor assembly according to claim 10, wherein the molded part is additionally configured as an insulating body, at least onto sections of which the winding assembly is wound.

17. The motor assembly according to claim 10, wherein the molded part is configured as a substrate for a winding connection.

18. The motor assembly according to claim 10, wherein the outer stator has stator grooves on its inner surface, which stator grooves are configured to enable sliding the outer stator onto the split tube section by moving the split tube section projections in the stator grooves during assembly of the motor assembly.

19. The motor assembly according to claim 18, wherein the split tube section projections are formed as ribs and extend in the axial direction into the region of the stator grooves to enable alignment of the outer stator relative to the split tube section.

20. The motor assembly according to claim 19, wherein a split tube section projection is disposed at least in sections in each stator groove.

21. The motor assembly according to claim 18, wherein the outer stator has pronounced stator poles with stator pole heads, and the split tube section projections engage in the region of the stator grooves between the stator pole heads.

22. The motor assembly according to claim 1, wherein the seal is configured as an adhesive bond with an adhesive, the adhesive connects the split tube section and the separating can base part to each other.

23. The motor assembly according to claim 1, wherein the seal is configured as a welded connection, that welded connection connects the split tube section and the separating can base part to each other.

24. The motor assembly according to claim 1, wherein the separating can base part forms a groove at least in sections, the groove engages in the split tube section, the groove is preferably configured as a circumferential groove.

25. A pump assembly, that comprises a motor assembly according to claim 1.

\* \* \* \* \*